United States Patent [15] 3,672,233
Hjermstad et al. [45] June 27, 1972

[54] ACTUATOR MECHANISM

[72] Inventors: Hans U. Hjermstad, Chicago; Carl J. Kopp, Arlington Heights, both of Ill.

[73] Assignee: C. P. Clare & Company

[22] Filed: July 6, 1970

[21] Appl. No.: 52,513

[52] U.S. Cl. ............................................................. 74/2
[51] Int. Cl. .................................................... G05g 17/00
[58] Field of Search .................................. 74/2; 89/1.5 R

[56] References Cited

UNITED STATES PATENTS 2,535,095  12/1950  Schwartz et al. .......................... 74/2

Primary Examiner—Milton Kaufman
Attorney—Jerry D. Hosier and Melvin F. Jager

[57] ABSTRACT

An electro-mechanical actuator comprises a housing defining a cylindrical chamber for receiving a plunger which is movable between an energy-storing, cocked position and a released position. Release is effected by momentary energization of a rotary armature of a solenoid in response to an electrical signal pulse. A latch arm of a slidable switch member is normally captivated by the plunger but is released upon its displacement thereby to permit movement of the slidable switch member. A locking means coupled to the rotary armature of the solenoid is movable on release of the plunger to captivate the latch arm until power is removed from the solenoid.

6 Claims, 5 Drawing Figures

3,672,233

PATENTED JUN 27 1972

Inventors
Hans U. Hjermstad
Carl J. Kopp
By Melvin F Jager & Jerry D Hosier
Attorneys

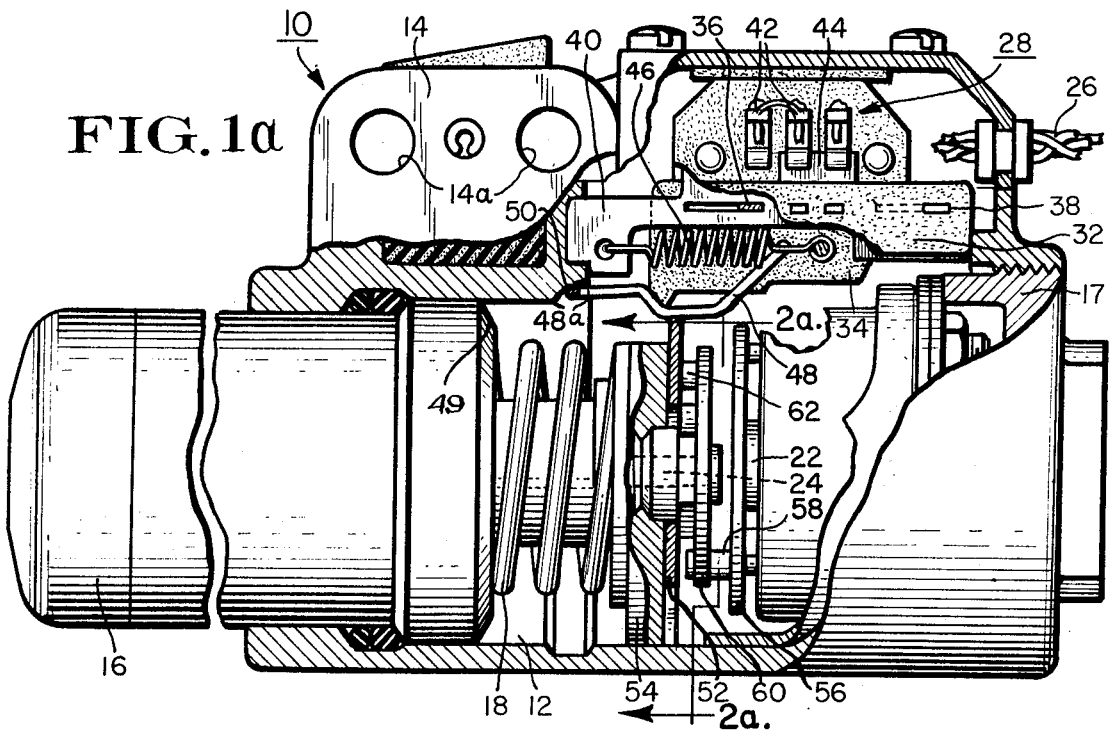
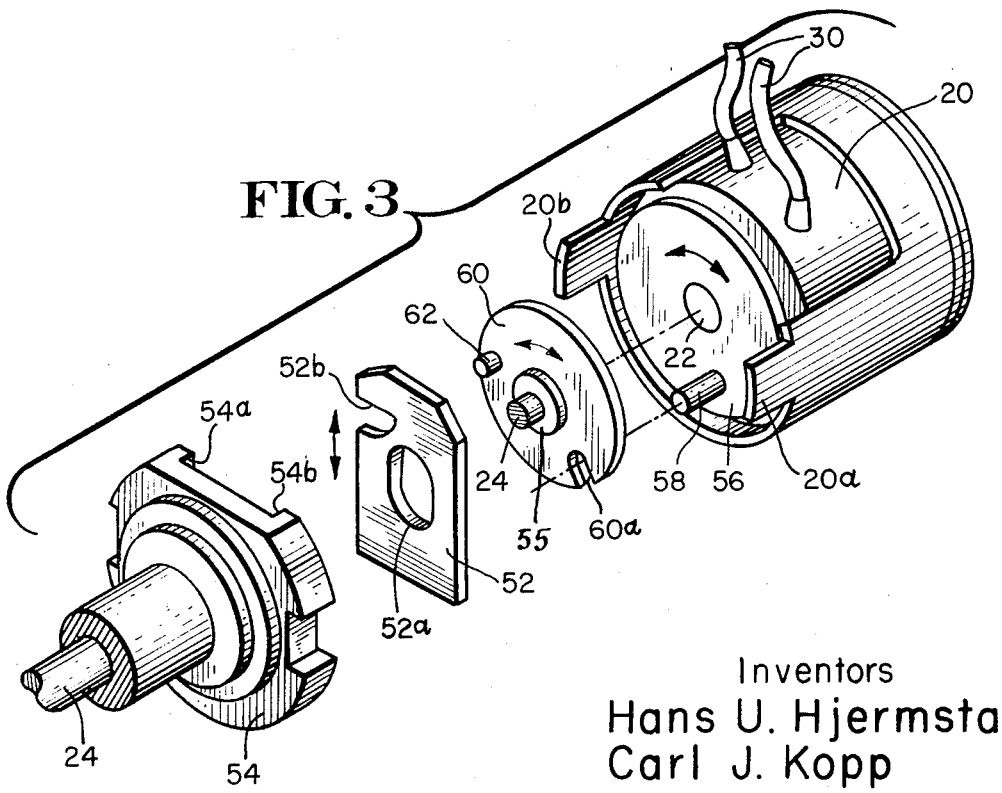

ACTUATOR MECHANISM

INTRODUCTION

The present invention relates generally to an electro-mechanical energy-storing and release mechanism and, more particularly, relates to an improved actuator mechanism of the type disclosed in the U.S. Pat. Nos. 2,776,570 and 3,364,752. The actuator of the invention is particularly useful in controlling a bomb shackle release device and, accordingly, will be described in that context although its more general utility will be recognized by those skilled in the art.

BACKGROUND OF THE INVENTION

Actuator mechanisms for controlling aircraft bomb release devices must, for obvious reasons, meet rigid design and operating standards before being adopted for use under adverse field conditions. These actuators must be designed to impart a substantial releasing force to bomb shackle release levers when energized by a relatively small energy electrical signal pulse from the aircraft power supply. The actuator must also be very compact and lightweight, easily and economically assembled and repaired, and capable of withstanding severe temperature, shock and vibration conditions. The electro-mechanical actuators described and claimed in the aforementioned patents have been very successful in meeting the above-mentioned structural and operational requirements.

Additionally, where it is required that a plurality of such actuators be operated in a timed sequence, it is required that a transfer switch mechanism associated with each actuator reliably operate under all conditions and be constructed so as not to be susceptible to inadvertent damage from improper cocking of the actuator mechanism or the like. For example, it is critical that bombs loaded on an aircraft in a succession of tiers be released in proper sequence and that the time interval between successive releases be sufficiently short that the bombs are released as a unitary array.

SUMMARY OF THE INVENTION

It is a primary objective of the present invention to provide an improved electro-mechanical actuator mechanism of the type disclosed in the aforesaid patents and particularly an improved and highly reliable transfer switch means therefor.

The electro-mechanical actuator mechanism of the invention incorporates a simplified transfer switch means designed to reliably operate under all conditions and one which is not subject to damage with improper handling or use of the mechanism such as, for example, occurred in prior art mechanisms if the plunger was cocked with an electrical signal applied to the solenoid of the actuator mechanism.

In accordance with the present invention, an electro-mechanical actuator comprises a housing defining an elongated, walled chamber. A plunger mounted within the chamber is movable therein from a first, ready position to a second, actuating position. An operating means includes a solenoid having a rotary armature normally biased to a first, angular position but momentarily displaceable to a second, angular position in response to an electrical input signal to the solenoid causing displacement of the plunger from its first to its second position. A switch means includes a slidable contact member yieldably biased toward a first position but movable against the bias to a second position and further includes a latch member operatively associated with the plunger for retaining the slidable contact member in the second position when the plunger is in the first position but releasing the slidable contact member upon movement of the plunger to the second position. There is also provided a locking means operatively coupled to the rotary armature of the solenoid and normally located in an inoperative position but momentarily movable to an operative position with displacement of the solenoid armature to the second angular position for operatively engaging the latch member to momentarily retain the slidable contact member in the second position as long as power is maintained to hold the rotary armature in its operated position.

BRIEF DESCRIPTION OF THE DRAWING

The novel features of the present invention are set forth with particularity in the appended claims. The invention together with further objects and advantages thereof may best be understood, however, by reference to the following description taken in conjunction with the accompanying drawings in the several figures of which like reference numerals identify like elements and in which:

FIG. 1a is a sectional view, similar to that of FIG. 1, but showing the plunger in its actuated position;

FIG. 2 is a cross-sectional view taken along lines 2—2 of FIG. 1;

FIG. 2a is a cross-sectional view taken along lines 2a—2a of FIG. 1a;

FIG. 3 is an exploded view of a portion of the actuator mechanism of the present invention.

DESCRIPTION OF THE PREFERRED EMBODIMENT

Figure 1:
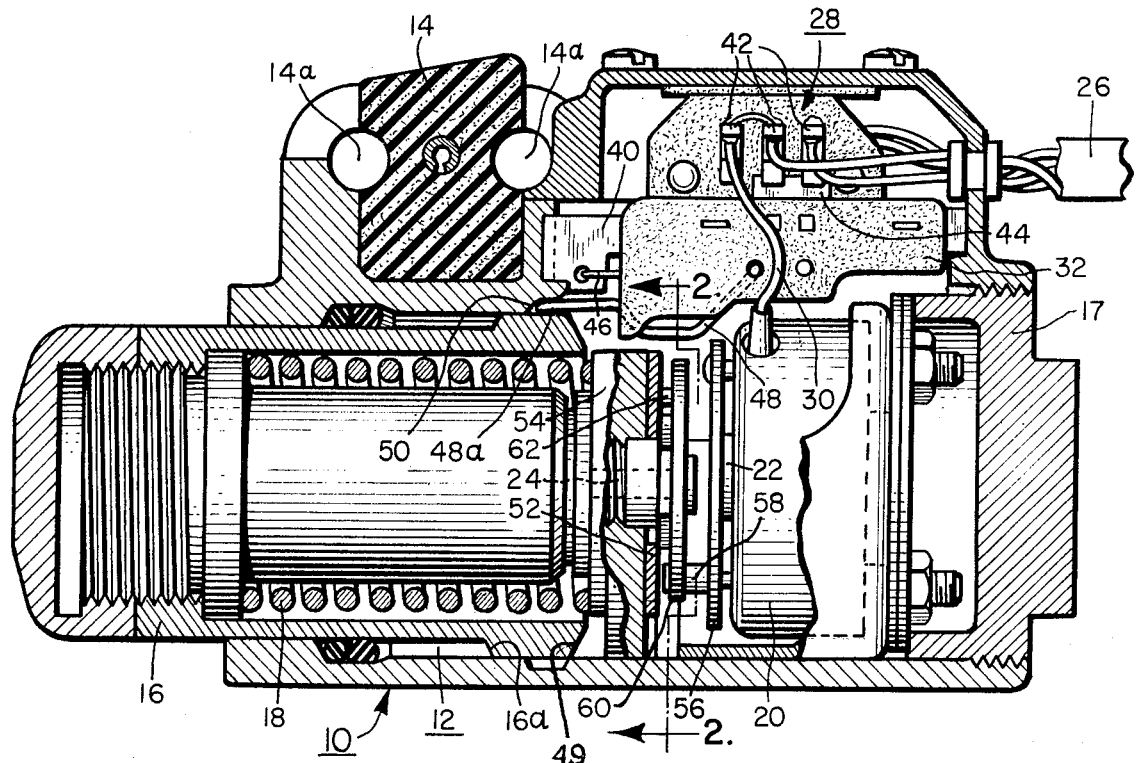
FIG. 1 is a sectional view of an actuator mechanism embodying the present invention and with the plunger shown in the cocked position.

Referring now to FIG. 1, the actuator mechanism there illustrated, except insofar as the present invention is concerned, is of a construction similar to that disclosed and claimed in U.S. Pat. No. 3,364,752 by the present inventors and assigned to the same assignee as the present invention. Specifically, the actuator comprises a body of housing 10 which defined an elongated, walled chamber 12 of a substantially cylindrical configuration. The housing 10 includes a support bracket 14 having a pair of bolt holes 14a for securing the assembled actuator in the proper position on a bomb release shackle (not shown) or the like. Housing 10 is further provided with an end closure plug 17 threadably received in one end of the housing; the plug 17 maintains the actuator components, described hereinafter, in proper assembled position within the housing 10 and effects a seal of one end of the chamber 12 so that the assembly is not subjected to the moisture and dirt. The housing 10 and enclosure plug 14 are preferably made from metal having a high magnetic reluctance.

The actuator mechanism also includes a cylindrical plunger 16 mounted within the chamber 12 and movable therein from a first, ready position as illustrated in FIG. 1 to a second, actuating position as depicted in FIG. 1a. The plunger 16 is normally captivated in its ready or cocked position (FIG. 1) by a locking and release mechanism (not shown); a preferred form of such locking and release mechanism is disclosed and claimed in the earlier mentioned U.S. Pat. Nos. 2,776,570 and 3,364,752.

Upon actuation of the locking and release mechanism, the plunger 16 is forcefully displaced to the left in the drawing under the influence of a highly compressed coil spring 18. The outward travel of the plunger 16 is limited by a peripheral flange 16a at the rear portion of the plunger which engages a complementary flange on the interior of the walled chamber 12. The plunger 16 is restored to its cocked position by manually forcing the plunger 16 into the chamber against the bias of spring 18 until the locking and release mechanism (not shown) again engages and captivates the plunger 16 to retain it in its cocked position.

Actuation of the locking and release mechanism, and thus the plunger 16, is regulated by an operating means including a solenoid 20 having a rotary armature 22. The solenoid 20 is constructed such that its armature 22 is spring biased against a stop abutment so as to normally be located in a first, angular position. The armature 22 is, however, momentarily displaceable against the spring bias to a second, angular position in response to an electrical input signal to the solenoid. The solenoid 20 is of a type responsive to a momentarily signal pulse on the order of 20 to 32 volts and includes a strong return spring for promptly restoring the solenoid armature to its quiescent position on termination of the energizing signal pulse. The solenoid 20 is of known construction and may, for example, be of the type disclosed in U.S. Pat. No. 2,496,880.

The rotary armature 22 of the solenoid 20 is coupled by mechanism presently to be described to a rotatable shaft 24 which in turn is connected to the locking and release mechanism (not shown) for the plunger 16. The shaft 24 thereby rotates in an angular direction and in angular increment corresponding to that of the shaft 22.

The solenoid 20 is selectively energized from a trigger circuit (not shown) located in the cockpit of the aircraft, etc. The electrical signal pulse from the trigger circuit is communicated to the solenoid 20 through electrical conductors 26, a switch means 28 and a pair of conductors 30. Typically, the signal from the trigger circuit is a 20 milli-second DC pulse from 20 to 32 volt energy source. This signal pulse energizes the solenoid 20 for a corresponding time interval after which the armature 22 is restored to its original position by the force of a built-in torsion spring (not shown).

The switch means 28 is adapted to couple an electrical signal pulse to the solenoid 20 when the plunger 16 is in its cocked position and to bypass the electrical signals to a successive actuator mechanism (not shown) subsequent to actuation of the plunger 16. To this end, the switch means 28 comprises a slidable contact member composed of a pair of space opposed insulative members 32 and 34 interconnected at a pair of spaced points by respective spacer members 36 and 38. The slidable contact member 32, 34 is adapted for reciprocating horizontal movement with respect to a fixed contact member 40 that is supported at its opposite ends by the housing 10. The fixed contact member 40 includes three spaced contact terminals 42 which connect respectively to the inlet leads 26 and the solenoid leads 30. Identical contact terminals are positioned on the opposite side of the fixed contact member 40, not visible in FIG. 1, and are likewise connected to respective ones of the electrical leads 26 and 30. Similarly, each of the insulative plates 32 and 34 composing the slidable contact member includes a conductive bridge for interconnecting a respective pair of the fixed contacts 42; only the contact bridge 44 affixed to the insulative plate 32 is visible in the drawings although it will be understood that a similar bridging plate is affixed to the insulative plate 34.

The slidable contact member 32, 34 of the switch means 28 is normally biased toward the left-hand side of the drawing under the influence of a bias spring 46 interconnected between the fixed and movable contact members. The switch means 28 further includes a latch member 48 pivotally supported at one end in opposed bearing apertures of the insulative plates 32, 34. The latch member 48 is freely pivotal but is normally confined with its terminus 48a positioned within a contoured cam recess 50, and retained therein by the plunger 16, of the walled chamber 12 by the plunger 16. The latch member 48 when positioned within the cam recess 50, retains the slidable contact member 32, 34 in its right-hand most position against the biasing force of the spring 46. Upon displacement of the plunger 16 to its actuating position shown in FIG. 1a, the latch member 48 is free to pivotally rotate out of the cam recess 50 thereby to permit displacement of the slidable contact member 32, 34 to its left-hand position.

In accordance with the present invention, a new and improved locking means is provided for retaining the latch member 48 in its captivated position within the recess 50 for a predetermined time interval subsequent to displacement of the plunger 16. By this locking means, it is assured that a successive actuator mechanism cannot receive an electrical input signal until expiration of a predetermined time interval following displacement of the plunger 16. More particularly, and referring to FIG. 3, the locking means comprises a cam plate 52 of generally rectangular outline and having an elliptical center aperture 52a and a peripheral cam slot 52b. The cam plate 52 is adapted for limited vertical reciprocation between operative and inoperative positions. To this end, a bearing block 54 which journals the shaft 24 of the plunger locking and release means, previously discussed, is provided with a guide track formed by a pair of opposed shoulder abutments 54a and 54b, only partially visible in FIG. 3. The cam plate 52 rides within the guide track formed by the abutments 54a, 54b for limited vertical movement as determined by the relative dimensions of the elliptical aperture 52a and the bearing sleeve 55 of the rotatable shaft 24 which is loosely journaled in the apertured cam plate.

The reciprocation of cam plate 52 is controlled by rotation of the armature 22 of the solenoid 20. Specifically, a first circular plate 56 is concentrically mounted to one end of the solenoid armature 22 for rotation therewith. A first drive or actuating pin 58 is fixedly mounted adjacent the periphery of the plate 56 so as to engage a cam slot 60a in a second circular plate 60. The second circular plate 60 is fixedly mounted to the rotational shaft 24 of the plunger locking and release mechanism and is interconnected to the first circular plate 56 through the drive pin 58. The second plate 60 likewise carries an associated drive pin 62 adjacent its periphery. The drive pin 62 projects into the cam slot 52b of the cam plate 52 thereby to vertically reciprocate the cam plate 52 in proportion to the angular movement of the solenoid shaft 22. A fixed alignment of the body of the solenoid 20 relative to the bearing block 54 and to the chamber 12 is attained by a pair of opposed tabs 20a, 20b of the solenoid body which engage associated notches on the opposed sides of bearing block 54.

The operation of the actuator mechanism 10 of the invention can best be appreciated by again referring to FIG. 1. As there shown, the plunger 16 is in its cocked position with the terminus 48a of the latch member 48 being captivated within the contoured cam recess 50 of the walled chamber 12. Under these circumstances, the slidable contact member 32, 34 is retained in its righthand most position and a direct electrical circuit path is provided from the wires 26 through the bridged contacts of the switch means 28 and the conductors 30 to the solenoid 20. Assuming the solenoid to be initially de-energized, the drive pin 58 is angularly disposed in the position indicated in FIGS. 1 and 2 thereby to retain the slidable cam plate 52 in its lowermost or inoperative position.

Assuming now that an appropriate electrical signal pulse is applied to the electrical leads 26, the solenoid 20 is energized to momentarily and rotationally displace the circular plate 56 and thus the drive pin 58. This movement effects a corresponding rotation of the second circular plate 60 to actuate the plunger locking and release mechanism while concurrently being effective to raise the cam plate 52 into engagement with the underside of the latch member 48, as shown in FIG. 1a. Normally, the solenoid remains energized for an interval of approximately 20 milli-seconds thereby to continue to captivate the latch member 48 for a like time interval. Upon de-energization of the solenoid 20, the solenoid armature 22 is restored by a spring return to its original position and through the interconnected plates 56 and 60, the cam plate 52 is likewise restored to its inoperative position shown in FIG. 1. The latch member 48 is now free to pivotally rotate out of the cam recess 50 thereby permitting the slidable contact member 32, 34 to move forward to its left most contact position under the influence of the bias spring 46. Accordingly, future electrical signals carried on the electrical wires 26 are bypassed through the switch means 28 to a successive actuator mechanism. The solenoid 20 is not re-energized until the plunger 16 is again cocked. In this regard, cocking of the plunger results in a camming of the latch member 48 upwardly along the inclined rearward surface 49 of the plunger into the cam recess 50.

While particular embodiments of the present invention have been shown and described, it is apparent that various changes and modifications may be made, and it is therefore intended in the following claims to cover all such modifications and changes as may fall within the true spirit and scope of this invention.

I claim:

1. An electro-mechanical actuator mechanism comprising:
   a housing defining an elongated, walled chamber including a contoured cam recess formed therein;

a plunger mounted within said chamber and moveable therein from a first, ready position to a second, actuating position;

operating means including a solenoid having a rotary armature normally biased to a first angular position but momentarily displaceable to a second angular position in response to an electrical input signal to said solenoid for causing displacement of said plunger from said first to said second position;

switch means including a slideable contact member yieldably biased toward a first position but moveable against said bias to a second position and further including a latch member having at least a portion thereof received within said contoured cam recess, said plunger in said first position captivating said latch member within said contoured cam recess for retaining said slideable contact member in said second position but releasing said latch member upon movement of said plunger to said second position;

and locking means operatively coupled to said rotary armature of said solenoid and normally located in an inoperative position but momentarily moveable to an operative position with displacement of said solenoid armature to said second angular position for operatively engaging said latch member to momentarily retain said slideable contact member in said second position for a predetermined time interval subsequent to displacement of said plunger.

2. The actuator mechanism of claim 1 in which said operating means includes a first actuating pin coupled to said armature for movement therewith, said first actuating pin being adapted for actuating said locking means.

3. The actuator mechanism of claim 2 in which said locking means comprises a cam plate confined for slideable movement between said operative and inoperative positions and in which said cam plate is operatively coupled to said first actuating pin.

4. The actuator mechanism of claim 3 in which said operating means comprises a first circular plate concentrically mounted to the end of said armature of said solenoid for rotation therewith and in which said first actuating pin is fixedly mounted adjacent the periphery of said first circular plate.

5. The actuator mechanism of claim 4 in which said operating means comprises a second circular plate mounted for rotation about an axis concentric with that of said armature and having a peripheral slot for receiving said first actuating pin and having a second actuating pin fixedly mounted adjacent the periphery of said second circular plate.

6. The actuator mechanism of claim 5 in which said slidable cam plate includes a cam track surface in engagement with said second actuating pin such that said slidable cam plate is displaced between its operative and inoperative positions with rotation of said solenoid armature.

* * * * *